(12) United States Patent
Elliott et al.

(10) Patent No.: US 10,725,784 B2
(45) Date of Patent: Jul. 28, 2020

(54) DATA PROCESSING SYSTEMS

(71) Applicant: ARM Limited, Cambridge (GB)

(72) Inventors: Robert Martin Elliott, Cambridge (GB); Vatsalya Prasad, Cambridge (GB)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 15/197,666

(22) Filed: Jun. 29, 2016

(65) Prior Publication Data
US 2017/0003972 A1    Jan. 5, 2017

(30) Foreign Application Priority Data

Jul. 3, 2015    (GB) .................................... 1511694.0

(51) Int. Cl.
*G06F 9/38*    (2018.01)
*G06T 1/20*    (2006.01)
(Continued)

(52) U.S. Cl.
CPC .......... *G06F 9/3851* (2013.01); *G06F 9/3001* (2013.01); *G06F 9/3004* (2013.01);
(Continued)

(58) Field of Classification Search
CPC ........... G06T 1/20; G06T 1/60; G06T 15/005; G06T 15/80; G06T 2210/52
See application file for complete search history.

(56) References Cited

U.S. PATENT DOCUMENTS 7,617,384 B1 * 11/2009 Coon .................... G06F 9/3851
                                                         712/220
8,074,224 B1 * 12/2011 Nordquist ............. G06F 9/3012
                                                         712/20
(Continued)

FOREIGN PATENT DOCUMENTS

GB          2517047          2/2015

OTHER PUBLICATIONS

Balfour, CUDA Threads and Atomics, NVIDIA Research, Apr. 2011 (Year: 2011).*

(Continued)

*Primary Examiner* — Phuc N Doan
(74) *Attorney, Agent, or Firm* — Vierra Magen Marcus LLP

(57) ABSTRACT

A data processing system has an execution pipeline with programmable execution stages which execute instructions to perform data processing operations provided by a host processor and in which execution threads are grouped together into groups in which the threads are executed in lockstep. The system also includes a compiler that compiles programs to generate instructions for the execution stages. The compiler is configured to, for an operation that comprises a memory transaction: issue to the execution stage instructions for executing the operation for the thread group to: perform the operation for the thread group as a whole; and provide the result of the operation to all the active threads of the group. At least one execution stage is configured to, in response to the instructions: perform the operation for the thread group as a whole; and provide the result of the operation to all the active threads of the group.

13 Claims, 9 Drawing Sheets

(51) Int. Cl.
  *G06F 9/30* (2018.01)
  *G06F 9/52* (2006.01)
  *G06F 9/46* (2006.01)
(52) U.S. Cl.
  CPC ............ *G06F 9/3887* (2013.01); *G06F 9/467* (2013.01); *G06F 9/522* (2013.01); *G06T 1/20* (2013.01)

(56) References Cited

U.S. PATENT DOCUMENTS

| | | | |
|---|---|---|---|
| 8,392,669 B1 | 3/2013 | Nyland | |
| 9,256,466 B2 | 2/2016 | Nystad | |
| 2005/0066149 A1* | 3/2005 | Kanade | G06F 9/4881 712/1 |
| 2007/0150657 A1* | 6/2007 | Yigzaw | G06F 12/0842 711/128 |
| 2007/0169030 A1* | 7/2007 | Tarditi, Jr. | G06F 9/466 717/140 |
| 2008/0163220 A1* | 7/2008 | Wang | G06F 8/458 718/101 |
| 2009/0138683 A1* | 5/2009 | Capps, Jr. | G06F 9/30101 712/220 |
| 2009/0144519 A1* | 6/2009 | Codrescu | G06F 9/526 711/207 |
| 2009/0282410 A1* | 11/2009 | Moir | G06F 8/443 718/101 |
| 2009/0300621 A1* | 12/2009 | Mantor | G06F 9/30087 718/100 |
| 2010/0088673 A1* | 4/2010 | Chen | G06F 8/4442 717/110 |
| 2010/0281465 A1* | 11/2010 | Krishnaswamy | G06F 8/45 717/124 |
| 2011/0078692 A1* | 3/2011 | Nickolls | G06F 9/3004 718/103 |
| 2012/0036329 A1* | 2/2012 | Coon | G06F 9/526 711/152 |
| 2013/0042090 A1* | 2/2013 | Krashinsky | G06F 9/3016 712/214 |
| 2013/0262830 A1* | 10/2013 | Gshwind | G06F 9/30196 712/213 |
| 2013/0275715 A1* | 10/2013 | Caprioli | G06F 12/10 711/203 |
| 2013/0318507 A1* | 11/2013 | Breternitz, Jr. | G06F 9/30072 717/129 |
| 2014/0129812 A1* | 5/2014 | Chakrabarti | G06F 9/38 712/234 |
| 2014/0189260 A1* | 7/2014 | Wang | G06F 12/1416 711/152 |
| 2014/0310484 A1* | 10/2014 | Giroux | G06F 12/08 711/154 |
| 2015/0026438 A1* | 1/2015 | Giroux | G06F 9/38 712/225 |
| 2015/0046655 A1* | 2/2015 | Nystad | G06F 12/0815 711/125 |
| 2015/0046662 A1 | 2/2015 | Heinrich | |
| 2015/0100764 A1* | 4/2015 | Tarolli | G06F 9/30072 712/216 |
| 2015/0128144 A1* | 5/2015 | Mansell | G06F 9/50 718/104 |
| 2015/0378733 A1* | 12/2015 | Beylin | G06F 9/3887 712/226 |
| 2017/0139757 A1* | 5/2017 | Mansell | G06F 9/3851 |
| 2018/0089422 A1* | 3/2018 | Kounavis | G06F 21/563 |
| 2018/0300139 A1* | 10/2018 | Que | G06T 1/20 |

OTHER PUBLICATIONS

Zhang, DAFT: Decoupled Acyclic Fault Tolerance, PACT'10, ACM, 2010 (Year: 2010).*
Wikipedia, Read—modify—write, (atomic operations) , Feb. 2015 (Year: 2015).*
GB Search Report dated Jan. 22, 2016, GB Patent Application No. GB1511694.0.

* cited by examiner

DATA PROCESSING SYSTEMS

BACKGROUND

The technology described herein relates to data processing systems, and in particular to the operation of graphics processing systems that include one or more programmable processing stages ("shaders").

Graphics processing is typically carried out in a pipelined fashion, with one or more pipeline stages operating on the data to generate the final render output, e.g. frame that is displayed. Many graphics processing pipelines now include one or more programmable processing stages, commonly referred to as "shaders". For example, a graphics processing pipeline may include one or more of, and typically all of, a geometry shader, a vertex shader and a fragment (pixel) shader. These shaders are programmable processing stages that execute shader programs on input data values to generate a desired set of output data (e.g. appropriately transformed and lit vertex data in the case of a vertex shader) for processing by the rest of the graphics pipeline and/or for output. The shaders of the graphics processing pipeline may share programmable processing circuitry, or they may each be distinct programmable processing units.

A graphics processing unit (GPU) shader core is thus a processing unit that performs graphics processing by running small programs for each graphics item in a graphics output to be generated such as a render target, e.g. frame (an "item" in this regard is usually a vertex or a fragment (pixel)). This generally enables a high degree of parallelism, in that a typical render output, e.g. frame, features a rather large number of vertices and fragments, each of which can be processed independently.

A shader program to be executed by a given "shader" of a graphics processing pipeline will be provided by the application that requires the graphics processing using a high level shader programming language, such as GLSL, HLSL, OpenCL C, etc. This shader program will consist of "expressions" indicating desired programming steps defined in the relevant language standards (specifications). The high level shader program is then translated by a shader language compiler to binary code for the target graphics processing pipeline. This binary code will consist of "instructions" which are specified in the instruction set specification for the given target graphics processing pipeline. The compilation process for converting the shader language expressions to binary code instructions may take place via a number of intermediate representations of the program within the compiler. Thus the program written in the high level shader language may be translated into a compiler specific intermediate representation (and there may be several successive intermediate representations within the compiler), with the final intermediate representation being translated into the binary code instructions for the target graphics processing pipeline.

A known way to improve shader execution efficiency is to group execution threads (where each thread corresponds, e.g., to one vertex or one fragment (pixel)) into "groups" or "bundles" of threads, where the threads of one group are run in lockstep, one instruction at a time, i.e. each thread in the group executes the same single instruction before moving onto the next instruction. This way, it is possible to share instruction fetch and scheduling resources between all the threads in the group. (Other terms used for such thread groups include "sub-groups", "warps" and "wavefronts". For convenience the term thread group will be used herein, but this is intended to encompass all equivalent terms and arrangements, unless otherwise indicated.)

In such thread groups, the shared instructions are executed for each thread and when memory access (e.g. for loads, stores and atomics) is required by a particular thread, a "lock" is obtained by the thread to ensure exclusive access to the data in memory being accessed by the thread, i.e. excluding the other threads from accessing the memory location, with each thread obtaining independent locks. However, because the threads cannot guarantee independent forward progress in all circumstances (because some steps executed by one thread may depend on other steps executed by other threads), a lock obtained by one thread may cause a deadlock for the whole thread group. This then causes one or more of the threads to spin indefinitely waiting for the lock to become available.

For example, the simple code sequence

```
while( !mtx_lock = mtx.trylock( ) )
{
    // critical section
}
``` can deadlock non-intuitively.

This is because the sequence requires that the flow of code is divergent and so threads from the divergent path (i.e. with a different program counter) must be masked out from execution. In a system having a "lowest program counter first" scheduling policy, threads which did not obtain the lock would therefore be favoured, but these would then spin indefinitely waiting for the lock.

One solution to this problem is to re-order the code to suit the scheduling behaviour of the specific system being used, e.g. using the following code sequence:

```
if( __my_warp_lane == 0 )
{
    while( !mtx.try_lock( ) );
}
// execute locked work
if( __my_warp_lane == 0 )
{
    mtx.unlock( );
}
```

However, this requires that the compiler does not optimise the instruction sequences, or has support for ordering semantics on the instructions.

The Applicants believe therefore that there remains scope for improvements to the handling of thread groups, for example in graphics processing pipelines that include one or more shader stages.

BRIEF DESCRIPTION OF THE DRAWINGS

A number of embodiments of the technology described herein will now be described by way of example only and with reference to the accompanying drawings, in which.

DETAILED DESCRIPTION

Figure 1:
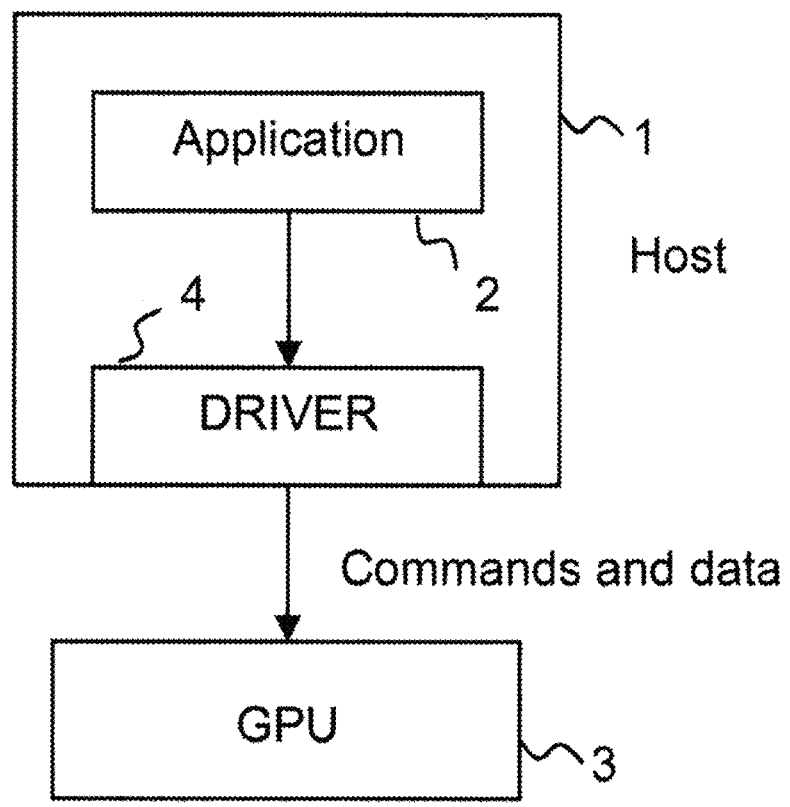
FIG. 1 shows schematically an exemplary computer graphics processing system.

One embodiment of the technology described herein comprises a method of operating a data processing system comprising an execution pipeline that comprises one or more programmable execution stages which execute instructions to perform data processing operations, and in which execution threads are grouped together into thread groups in which the threads of the thread group are executed in lockstep, one instruction at a time, the method comprising:

for an operation to be executed for a thread group by an execution stage of the execution pipeline of the data processing system that comprises a memory transaction:

issuing to the execution stage an instruction or set of instructions to cause the execution stage to:

perform the operation for a thread group as a whole; and to provide the result of the operation to all the active threads of the thread group; and the execution stage of the execution pipeline in response to the instruction or set of instructions:

performing the operation for a thread group as a whole; and providing the result of the operation to all the active threads of the thread group.

Another embodiment of the technology described herein comprises a data processing system comprising:

an execution pipeline that includes one or more programmable execution stages which execute instructions to perform data processing operations and in which execution threads are grouped together into thread groups in which the threads of the group are executed in lockstep, one instruction at a time; and a compiler that compiles programs for the execution pipeline to generate instructions for execution stages of the execution pipeline;

wherein the compiler is configured to, for an operation to be executed for a thread group by an execution stage of the execution pipeline that comprises a memory transaction:

issue to the execution stage an instruction or set of instructions to cause the execution stage to:

perform the operation for a thread group as a whole; and to provide the result of the operation to all the active threads of the thread group; and wherein at least one execution stage of the execution pipeline is configured to, in response to the instruction or set of instructions:

perform the operation for a thread group as a whole; and provide the result of the operation to all the active threads of the thread group.

The technology described herein relates to the execution of operations in data processing pipelines in which execution threads are grouped together into thread groups ("warps"), with the threads in a thread group being executed together in lockstep, one instruction at a time, i.e. each thread in the group executes the same single instruction before moving onto the next instruction. A thread group may contain any suitable and desired number of threads. In an embodiment, a thread group is made up of four individual threads.

In the technology described herein, for one or more operations (that involve a memory transaction) to be executed, an instruction or set of instructions that are executed by the threads of a thread group for the operation are issued to a programmable execution stage of the execution pipeline, where they are executed. The instruction or set of instructions are executed for the thread group as a whole and the result of this thread group (warp)-wide operation is delivered to all active threads in the thread group. (An active thread is one which is currently executing an instruction or waiting to execute an instruction, i.e. as opposed to inactive threads which have diverged or terminated their execution.)

Thus, rather than executing the instruction or set of instructions for the operation for each thread in the group, the instruction or set of instructions is executed by the execution stage for the thread group as a whole.

By performing the operation for the thread group as a whole, i.e. for all the active threads which are being executed in lockstep, this helps to prevent the threads from deadlocking. This is because the operation is being performed for all the active threads in the thread group together, so no thread must wait for the operation to complete for another thread, e.g. while accessing the memory using a lock, before that thread can perform the operation.

Furthermore, because the operation is being performed for the thread group as a whole and thus, e.g., making it redundant for each thread to perform the operation individually, the processing involved, bandwidth required, data transferred and thus power consumed is reduced.

The operation may comprise any suitable and desired data processing operation that involves a memory transaction.

In an embodiment the operation comprises an atomic operation. An "atomic" memory operation is an operation sequence that reads a memory location, performs an arithmetic operation between the memory value and a register value, and then writes the result of the arithmetic operation back to the same memory location. This sequence of operations is carried out so that to every observer, it looks as if the sequence has either not been performed at all, or been performed in its entirety. It is executed as one indivisible unit, hence the name "atomic".

The atomic operation, performed for the thread group as a whole, may comprise any suitable and desired atomic operation. For example, the atomic operation may comprise a permute operation, e.g. containing shuffle instructions to change the order of a set of data, a similar low level instruction or instructions, e.g. a reduction operation, a basic arithmetic instruction or instructions, e.g. addition, subtraction, division, etc., or a compare or exchange instruction or instructions, etc.

In an embodiment the atomic operation, performed for the thread group as a whole, comprises a lock operation. A "lock" operation is an operation to reserve access to storage, e.g. memory, exclusively for an execution thread obtaining the lock, such that the data in storage it is accessing cannot be accessed, and thus potentially changed, by another execution thread while the lock is in place. Thus generally while the lock is in place a further operation, e.g. an arithmetic operation, is performed using the data that the execution thread has access to, with this being the result that is then provided to the active threads in the thread group.

It will be appreciated that this particular type of atomic operation, i.e. a lock operation, is particularly suited to the technology described herein as it helps to solve the problem of deadlocking threads in a thread group when one or more threads are waiting for a lock which is currently held by another thread. By obtaining and using the lock for the thread group as a whole, i.e. such that the thread group as a whole has exclusive access to the data in memory being accessed by the thread group, this helps to prevent the threads from deadlocking because independent locks for each individual thread are not required.

The instruction or set of instructions to perform the operation for the thread group as a whole and to provide the result of the operation to all the active threads of the thread group may be provided in any suitable and desired way. In an embodiment the compiler for execution stage in question includes the instruction(s) in the set of instructions that are issued to the execution pipeline, as will be described below.

In one embodiment, the instructions for performing the operation for the thread group as a whole are visible to the application program interface and thus a programmer may explicitly include the instructions in the application program code for the operation to be performed (with the compiler then generating an instruction or set of instructions to perform the operation for the thread group as a whole and to provide the result of the operation to all the active threads of the thread group, in response thereto).

In an embodiment, the compiler is configured also or instead to (be able to) automatically (of its own volition) provide the instruction or set of instructions to perform the operation for the thread group as a whole and to provide the result of the operation to all the active threads of the thread group, i.e. without the instruction or set of instructions having been included explicitly, e.g. by a programmer, in the application program code. Thus, in an embodiment, the method further comprises the step of (and the compiler is configured to): automatically inserting an instruction or set of instructions for performing the operation for the thread group as a whole and providing the result of the operation to all the active threads of the thread group in the compiled application program code for the operation.

The compiler may automatically provide the instruction or set of instructions in any suitable and desired way. For example, the compiler may be configured to identify opportunities to insert an instruction or set of instructions for performing an operation for a thread group as a whole when compiling the application program code, e.g. by recognising one or more particular steps in the program code.

(Of course, the compiler may not identify an opportunity to issue to an execution stage an instruction or set of instructions for executing an operation for the thread group as a whole, in which case the compiler will not issue an instruction or set of instructions for executing an operation for a thread group as a whole, e.g. when it is not determined to be beneficial for the operation's execution.)

The instruction or set of instructions for performing the operation for the thread group as a whole and providing the result of the operation to all the active threads of the thread group could be configured to apply only to a single thread group, with other thread groups not encountering this instruction or set of instructions when they perform the operation. However, in an embodiment, the instruction or set of instructions for performing the operation for the thread group as a whole and providing the result of the operation to all the active threads of the thread group is provided for and encountered by all the thread groups performing the operation.

In an embodiment, the compiler is configured to (be able to) re-order the steps in the program code, e.g. to improve the efficiency of its execution for a thread group. For operations, e.g. atomic operations, that may be performed individually for each thread in a thread group, e.g. per-thread locking operations, as these operations may naturally diverge, that can make them difficult for a compiler to optimise, e.g. because re-ordering the steps in the program code may introduce deadlocks. However, when, in the technology described herein, the operation is performed for the thread group as a whole, that makes it easier to re-order with respect to the rest of the other steps in the program code because there is less risk of deadlocking. This means that the compiler can more safely re-order the steps in the program code or re-schedule the operation performed for the thread group as a whole, with reduced risk of deadlocking.

Therefore, in an embodiment, the method comprises the step of (and the compiler is configured to): re-ordering (the issuing of) an instruction or set of instructions that perform an operation for a thread group as a whole relative to other instructions in the shader program in question. Thus the compiler may bring forward or move back the instruction or set of instructions for executing an operation for a thread group as a whole. Such re-ordering may help to optimise (OpenCL) driver software implementation.

In an embodiment the operation is performed, i.e. the instruction(s) are executed, only once for a thread group as a whole. Thus once the operation has been performed for a thread group as a whole, e.g. when encountered initially by one of the threads in a thread group, and the result of the operation provided to all of the active threads in the thread group, in this embodiment the operation is not performed again when, e.g., another thread of the thread group encounters the operation subsequently. This is because the result of the operation has already been provided to all of the active threads in the thread group, so threads encountering the operation can simply refer to the result, e.g. by reading from a register, rather than performing it themselves.

The operation may be performed for the thread group as a whole, and the result of the operation may be provided to all the active threads of the thread group, in any suitable and desired way.

In one embodiment the instruction or set of instructions is executed by the execution stage for one of the threads in the thread group on behalf of the other threads in the thread group, such that the operation is performed for the thread group as a whole and the result of the operation is provided to all the active threads of the thread group. Thus, when one of the threads encounters (e.g. by reaching the necessary program counter) the instruction or set of instructions (which is, e.g., the first thread to encounter the instruction) the instruction or set of instructions is executed by the execution stage for that thread only (but on behalf the thread group as a whole).

The instruction or set of instructions may be executed for one thread on behalf of the other threads in the thread group in any suitable and desired way. In an embodiment all the threads in the thread group, e.g. those which encounter the instruction or set of instructions, apart from the thread for which the instruction or set of instructions is being executed, are masked off, thus making these masked threads temporarily inactive. Masking off the other threads in the thread group prevents these threads from encountering the instruction while the instruction or set of instructions is executed by the one thread, such that operation is performed for the thread group as a whole. The mask may be removed when the instruction or set of instructions has been executed and the result of the operation has been provided to all the active threads of the thread group.

Therefore in one embodiment, the method comprises the step of (and the execution stage is configured to): when the instruction or set of instructions is received by the execution stage, the instruction or set of instructions having been fetched for a thread in the thread group: the execution stage masking all the (e.g. active) threads in the thread group apart from the thread that fetched the instruction or set of instructions; and the execution stage executing the instruction or set of instructions for the thread to perform the operation for the thread group as a whole and to provide the result of the operation to all the active threads of the thread group.

In another embodiment each of the execution threads in the thread group is arranged to check the status of the other threads in the thread group when they encounter the instruction or set of instructions, e.g. to check if another thread already has executed, or started to execute, the instruction or set of instructions. This helps to ensure that the instruction or set of instructions is only executed once, otherwise this may cause the thread and/or thread group to deadlock. In this case the threads will not execute in lockstep.

In another embodiment, in response to the instruction or set of instructions, the operation is performed collectively for the thread group by the execution stage, i.e. compared to the above described embodiment in which the instruction or set of instructions is executed for one thread on behalf of the thread group. Therefore, in an embodiment, the method comprises the steps of (and the execution stage is configured to): when the instruction or set of instructions is received by the execution stage, the execution stage executing the instruction or set of instructions collectively for the thread group.

The instruction or set of instructions may be executed collectively for the thread group in any suitable and desired way. In one embodiment the instruction or set of instructions is executed by the execution stage for the thread group (i.e. the execution stage which is configured to execute all the other instructions for the, e.g. shader, program being executed for the thread group).

In another embodiment the instruction or set of instructions are executed by a separate execution stage from the execution stage that is being used to execute operations for the threads, i.e. such that they are not carried out for a particular thread, e.g. on behalf of the thread group, but rather separately for the thread group as a whole. In an embodiment the separate execution stage comprises a scalar engine, e.g. which is arranged alongside the execution stage for the thread group. The separate execution stage, e.g. the scalar engine, is then configured to return the result of the operation to the active threads of the thread group.

Once the operation has been performed by the execution stage of the execution pipeline, the result of the operation is provided to all of the active threads in the thread group, i.e. a uniform (the same) result is provided to all the active threads. (Any inactive threads in the thread group are assumed not to require the result of the operation.) The result may be provided to the active threads in the thread group in any suitable and desired way.

In an embodiment the result is provided to one or more storage arrangements, e.g. memory or registers, that can be read by the active threads in the thread group. The storage arrangement may comprise a shared storage arrangement, e.g. a shared memory or register, that can be read by all the active threads in the thread group. This is particularly convenient because there may be other reasons to use a storage arrangement, e.g. a register, for the thread group as a whole, e.g. to store other data used with the execution of operations for the thread group. In another embodiment the storage arrangements may comprise a separate storage arrangement, e.g. a separate (e.g. private) memory or register, for each of the active threads in the thread group.

In one embodiment the result of the operation is broadcast to all the active threads in the thread group, e.g. the execution stage sends a message to all the active threads to let them know that the result is available to be read, e.g. from a storage arrangement.

The execution stage may be associated with a particular storage arrangement or arrangements to which the result of the operation is provided, e.g. the register for a thread, and thus the execution stage may already know in advance where to return the result of the operation. In another embodiment the instruction or set of instructions to provide the result of the operation to all of the active threads in the thread group contains an indication of the location of the storage arrangement(s), e.g. the registers, to provide the result of the operation to. This is then used by the execution stage to determine where to provide the result of the operation.

To allow the result of the operation to be provided to the active threads in the thread group, e.g. by broadcasting a message to the active threads in the thread group and/or by providing the result to separate storage arrangements for each of the active threads in the thread group, in an embodiment the execution stage knows which threads in the thread group are active (this is particularly the case when the execution stage comprises a scalar engine). This may be achieved in any suitable and desired way. In an embodiment the instruction or set of instructions to provide the result of the operation to all of the active threads in the thread group comprises an indication of the active threads in the thread group.

In another embodiment, e.g. in which the result of the operation is provided to a separate storage arrangement for each of the active threads in the thread group, the write to the, e.g. registers, for the inactive threads is masked out to prevent the result being provided to these threads.

The method and the data processing system of the technology described herein may be arranged to work with program code which is divergent when executed. The divergence of the execution may happen before and/or after the operation is performed for the thread group as a whole. When the threads diverge before the operation is performed for the thread group as a whole then the divergent, e.g. inactive, threads may be masked to help prevent any potential deadlocking.

Thus the operation may only be performed for those threads who are convergent (e.g. naturally convergent, as much as is appropriate) at the time of the instruction or set of instructions being executed by the execution stage. The divergent threads, i.e. those which are not convergent at the time of the instruction or set of instructions being executed, e.g. owing to having taken a different condition in an "if, then, else" statement, may be masked out, e.g. stalled, and do not execute the operation. In an embodiment the divergent threads also include any inactive threads. This allows the operation to be performed for, and its result provided to, only the active threads.

The technology described herein also extends to the compiler itself. Thus, another embodiment of the technology described herein comprises a compiler that compiles programs to generate instructions for execution stages of an execution pipeline that includes one or more programmable execution stages that execute instructions to perform data processing operations, and in which execution threads are grouped together into thread groups in which the threads of the group are executed in lockstep, one instruction at a time, wherein the compiler is configured to, for an operation to be executed for a thread group by an execution stage of the execution pipeline that comprises a memory transaction:
  issue to the execution stage an instruction or set of instructions to:
    perform the operation for the thread group as a whole; and
    to provide the result of the operation to all the active threads of the thread group.

Another embodiment of the technology described herein comprises a method of compiling a program to generate instructions for an execution stage of an execution pipeline that includes one or more programmable execution stages that execute instructions to perform data processing operations, and in which execution threads are grouped together into thread groups in which the threads of the group are executed in lockstep, one instruction at a time, the method comprising:
  for an operation to be executed for a thread group by an execution stage of the execution pipeline of the data processing system that comprises a memory transaction:
    issuing to the execution stage an instruction or set of instructions to:
      perform the operation for the thread group as a whole; and
      to provide the result of the operation to all the active threads of the thread group.

The technology described herein also extends to an execution pipeline having one or more execution stages that can perform processing in response to (and using) the instructions of the technology described herein.

Thus, another embodiment of the technology described herein comprises an execution pipeline for a data processing system that includes one or more programmable execution stages which execute instructions to perform data processing operations, and in which execution threads may be grouped together into thread groups in which the threads of the group are executed in lockstep, one instruction at a time, wherein:
  at least one execution stage of the execution pipeline is configured to, when executing instructions in an instruction stream, in response to an instruction or set of instructions in the instruction stream for executing an operation for a thread group:
    perform the operation for the thread group as a whole; and
    provide the result of the operation to all the active threads of the thread group.

Another embodiment of the technology described herein comprises a method of operating an execution pipeline for a data processing system that includes one or more programmable execution stages which execute instructions to perform data processing operations, and in which execution threads are grouped together into thread groups in which the threads of the group are executed in lockstep, one instruction at a time, the method comprising:
  at least one execution stage of the execution pipeline, when executing instructions in an instruction stream, in response to an instruction or set of instructions in the instruction stream for executing an operation for a thread group:
    performing the operation for the thread group as a whole; and
    providing the result of the operation to all the active threads of the thread group.

As will be appreciated by those skilled in the art, these embodiments of the technology described herein can include any one or more or all of the optional features of the technology described herein, as appropriate.

In an embodiment all the execution stages (each execution stage) of the execution pipeline can and do operate in the manner of the technology described herein.

Each programmable processing stage (execution unit) may comprise any suitable programmable hardware element such as programmable processing circuitry. Each programmable processing stage may be provided as a separate circuit element to other programmable stages of the processing pipeline or the programmable processing stages may share some or all of their programmable processing circuitry (that is then differently programmed to serve as the desired programmable processing stage).

As described above, in an embodiment the data processing system of the technology described herein comprises a graphics processing system comprising a graphics processing pipeline. The graphics processing pipeline may in this case be used to perform graphics processing (in which case each thread in a group of threads may correspond to one vertex or one fragment (pixel) and/or sampling point) but it could also be operated as a compute shader pipeline (e.g. in accordance with OpenCL) (in which case each thread will, e.g., correspond to an appropriate compute shader work item).

Thus, the execution pipeline may be a graphics processing pipeline, a compute shader pipeline, etc.

In these arrangements, the graphics (or other) processing pipeline may comprise a sequence of different processing stages, which each perform, e.g., a different operation to provide the output of the processing pipeline. In an embodiment the processing pipeline comprises one or more, e.g. a plurality of, processing stages, e.g. which work together to implement the operation of the technology described herein.

In the case of a graphics and/or compute shader processing pipeline, the execution units (stages) may comprise programmable, shading stages of the processing pipeline such as the vertex shader, fragment shader, etc. These stages can be implemented as desired and in any suitable manner, and can perform any desired and suitable shading, e.g. vertex shading, fragment shading, etc., functions, respectively and as appropriate. In the case of a fragment shader, for example, the fragment shader may render a primitive or primitives to generate a set of render output values, e.g. representing a frame for display. These output values may then be exported to external memory for storage and use, such as to a frame buffer for a display.

As well as the programmable processing (shader) stages, the graphics processing pipeline may also contain any other suitable and desired processing stages that a graphics processing pipeline may contain such as a rasteriser, an early depth (or an early depth and stencil) tester, a late depth (or depth and stencil) tester, a blender, a tile buffer, a write out unit, etc.

The technology described herein can be used for all forms of output that a graphics (or other) processing pipeline may be used to generate, such as frames for display, render to texture outputs, compute shader outputs, etc. In an embodiment the output, e.g. fragment shaded, data values from the processing is exported to external, e.g. main, memory, for storage and use, such as to a frame buffer for a display.

In an embodiment the execution pipeline also comprises, and/or is in communication with, one or more memories and/or memory devices that store the data described herein, and/or that store software for performing the processes described herein. The execution pipeline may also be in communication with a host microprocessor, and/or with a display for displaying images based on the data generated by the execution pipeline.

The technology described herein is applicable to any suitable form or configuration of graphics processor. It is particularly applicable to tile based graphics processors and graphics processing systems. Thus in an embodiment, the graphics processing system and graphics processing pipeline are a tile-based system and pipeline, respectively.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, stages, etc., of the technology described herein may be duplicated and/or carried out in parallel on a given processor. Equally, the various processing stages may share processing circuitry, etc., if desired.

Subject to any hardware necessary to carry out the specific functions discussed above, the data processing system and pipeline can otherwise include any one or more or all of the usual functional units, etc., that data processing pipelines include.

It will also be appreciated by those skilled in the art that all of the described embodiments of the technology described herein can include, as appropriate, any one or more or all of the optional features described herein.

The methods of the technology described herein may be implemented at least partially using software e.g. computer programs. It will thus be seen that in further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor, said processor, renderer or system to carry out the steps of the methods of the technology described herein. Such a computer software carrier could be a physical storage medium such as a ROM chip, CD ROM, RAM, flash memory, or disk.

It will further be appreciated that not all steps of the methods of the technology described herein need be carried out by computer software and thus in a further embodiment the technology described herein comprises computer software and such software installed on a computer software carrier for carrying out at least one of the steps of the methods set out herein.

The technology described herein may suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display.

FIG. 1 shows schematically a typical computer graphics processing system.

An application 2, such as a game, executing on a host processor 1 will require graphics processing operations to be performed by an associated graphics processing unit (graphics processing pipeline) 3. To do this, the application will generate API (Application Programming Interface) calls that are interpreted by a driver 4 for the graphics process pipeline 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

Figure 2:
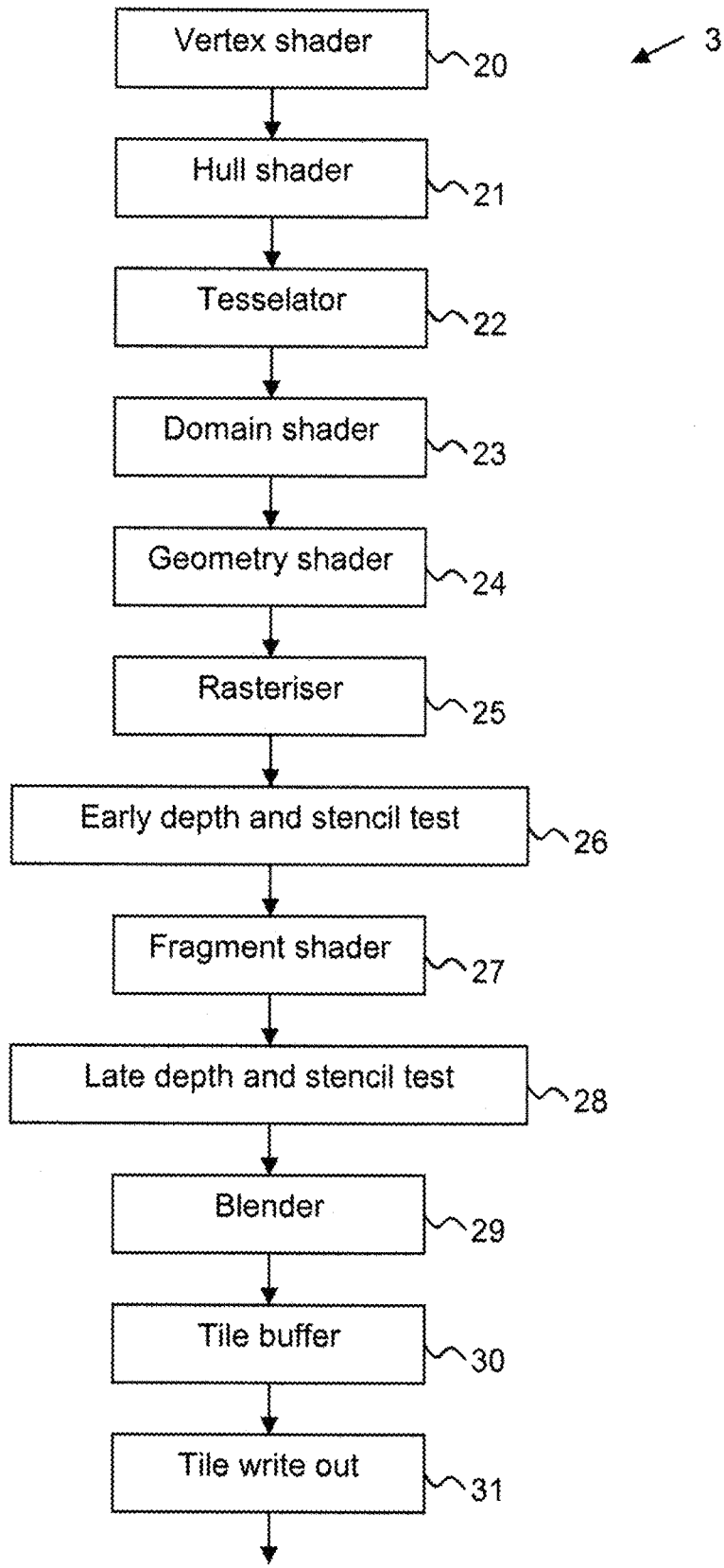
FIG. 2 shows schematically a graphics processing pipeline that can be operated in the manner of the technology described herein.

FIG. 2 shows the graphics processing pipeline 3 of the present embodiment in more detail.

The graphics processing pipeline 3 shown in FIG. 2 is a tile based renderer and will thus produce tiles of a render output data array, such as an output frame to be generated.

(In tile based rendering, rather than the entire render output, e.g., frame, effectively being processed in one go as in immediate mode rendering, the render output, e.g., frame to be displayed, is divided into a plurality of smaller sub regions, usually referred to as "tiles". Each tile (sub region) is rendered separately (typically one after another), and the rendered tiles (sub regions) are then recombined to provide the complete render output, e.g., frame for display. In such arrangements, the render output is typically divided into regularly sized and shaped sub regions (tiles) (which are usually, e.g., squares or rectangles), but this is not essential.)

The render output data array may typically be an output frame intended for display on a display device, such as a screen or printer, but may also, for example, comprise intermediate data intended for use in later rendering passes (also known as a "render to texture" output), etc.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

FIG. 2 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

As shown in FIG. 2, the graphics processing pipeline 3 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 3. The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 3.

The rasterisation stage 25 of the graphics processing pipeline 3 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z buffer value for the fragment's position stored in the Z-buffer in the tile buffer 30 to determine whether the fragment data for the new fragments should replace the fragment data of the fragments that have already been rendered, by comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z buffer within the tile buffer 30. (The tile buffer will store colour and depth buffers that store an appropriate colour, etc., or Z value, respectively, for each sampling point that the buffers represent (in essence for each sampling point of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). (The display device could comprise, e.g., a display comprising an array of pixels, such as a computer monitor or a printer.)

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 3 would, of course, be possible.

The above describes certain features of the operation of the graphics processing system shown in FIG. 1. Further features of the operation of the graphics processing system shown in FIG. 1 will now be described.

As can be seen from FIG. 2, the graphics processing pipeline 3 includes a number of programmable processing or "shader" stages, namely the vertex shader 20, hull shader 21, domain shader 23, geometry shader 24, and the fragment shader 27. These programmable shader stages execute respective shader programs that have one or more input variables and generate sets of output variables and that are provided by the application. To do this, the application 2 provides the shader programs implemented using a high-level shader programming language, such as GLSL, HLSL, OpenCL, etc. These shader programs are then translated by a shader language compiler to binary code for the target graphics processing pipeline 3. This may include the creation of one or more intermediate representations of the program within the compiler. (The compiler may, e.g., be part of the driver 4, with there being a special API call to cause the compiler to run. The compiler execution can thus be seen as being part of the draw call preparation done by the driver in response to API calls generated by an application).

Each shader in the graphics processing pipeline, e.g. as shown in the embodiment of FIG. 2, is a processing unit that, based on commands received by the graphics processing pipeline from the application, performs graphics processing by running small programs for each graphics item in a graphics output to be generated (an "item" in this regard is usually a vertex, a fragment or a pixel). The present embodiments relate to the situation where execution threads to be executed by a shader (where each thread corresponds to one graphics item) have been organised into a "group" or "bundle" of threads that are to be run in lockstep, one instruction at a time, and are to perform an atomic memory operation, e.g. a lock operation.

(An "atomic" memory operation is an operation sequence that reads a memory location, performs an arithmetic operation between the memory value and a register value, and then writes the result of the arithmetic operation back to the same memory location. This sequence of operations is carried out so that to every observer, it looks as if the sequence has either not been performed at all, or been performed in its entirety. It is executed as one indivisible unit, hence the name "atomic".)

Figure 3:
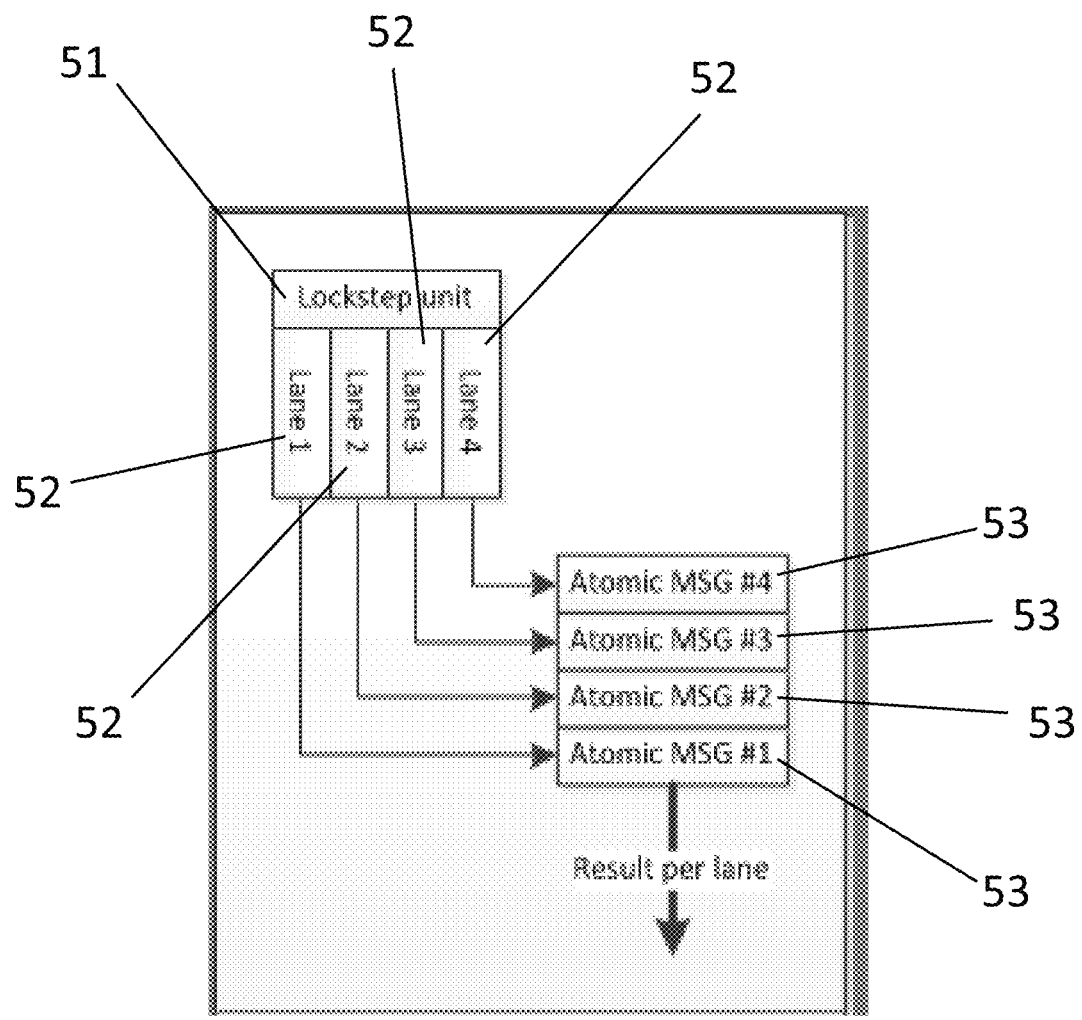
FIG. 3 shows schematically a group of execution threads.

FIG. 3 shows a schematic of an execution stage 51 ("lockstep unit") for such a group of threads, comprising four individual execution lanes 52 ("Lane 1", "Lane 2", "Lane 3", "Lane 4") which perform the execution of instructions for the individual threads. The results 53 ("Atomic MSG #1", "Atomic MSG #2", "Atomic MSG #3", "Atomic MSG #4") of an operation executed by the execution lanes 52 (through the execution of an instruction or set of instructions) for the threads are provided for each execution thread 52 individually.

Figure 4:
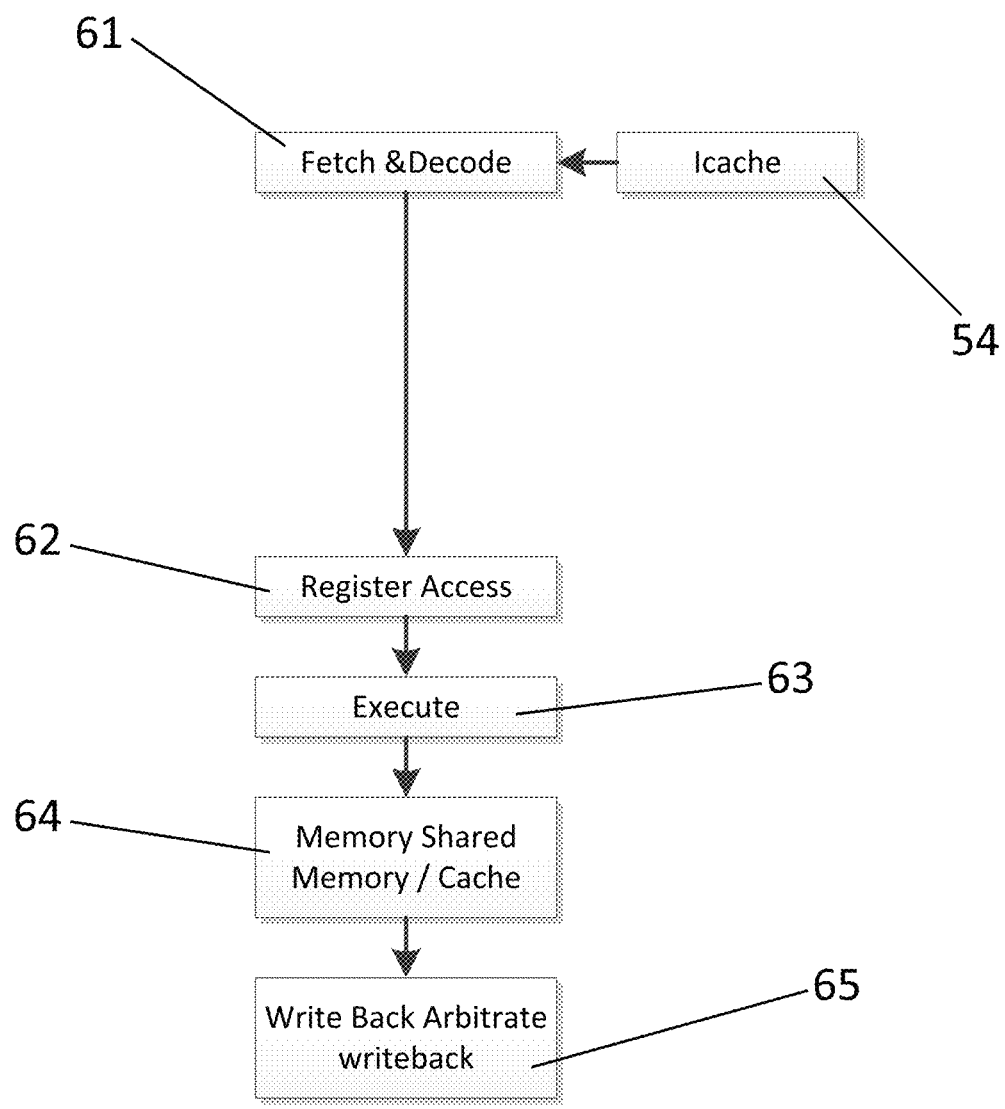
FIG. 4 shows a flow chart of the operation of the group of execution threads shown in FIG. 2.

FIG. 4 is a flow chart showing the operation for a group of threads, e.g. as shown in FIG. 3, when performing an atomic operation. First, the compiled instructions for the atomic operation are fetched from an instruction cache 54 and decoded, e.g. by an execution stage (step 61, FIG. 4). The execution threads in the thread group each work through the instructions, using data accessed from the registers of the threads (step 62, FIG. 4) to be used in the atomic operation, e.g. in an arithmetic operation. The atomic operation is executed by the execution stage for each thread (step 63, FIG. 4), which generally involves writing data to a shared memory area or cache (step 64, FIG. 4).

Once the atomic operation has been executed, the result of the operation ("Atomic MSG #1", "Atomic MSG #2", "Atomic MSG #3", "Atomic MSG #4") 53), e.g. a modification of the register data owing to the arithmetic operation, is written back to the registers for each of the threads in the thread group (step 65, FIG. 4), so that the result can be accessed by each of the threads in the thread group.

FIGS. 5 to 9 illustrate various embodiments of the above operation.

Figure 5:
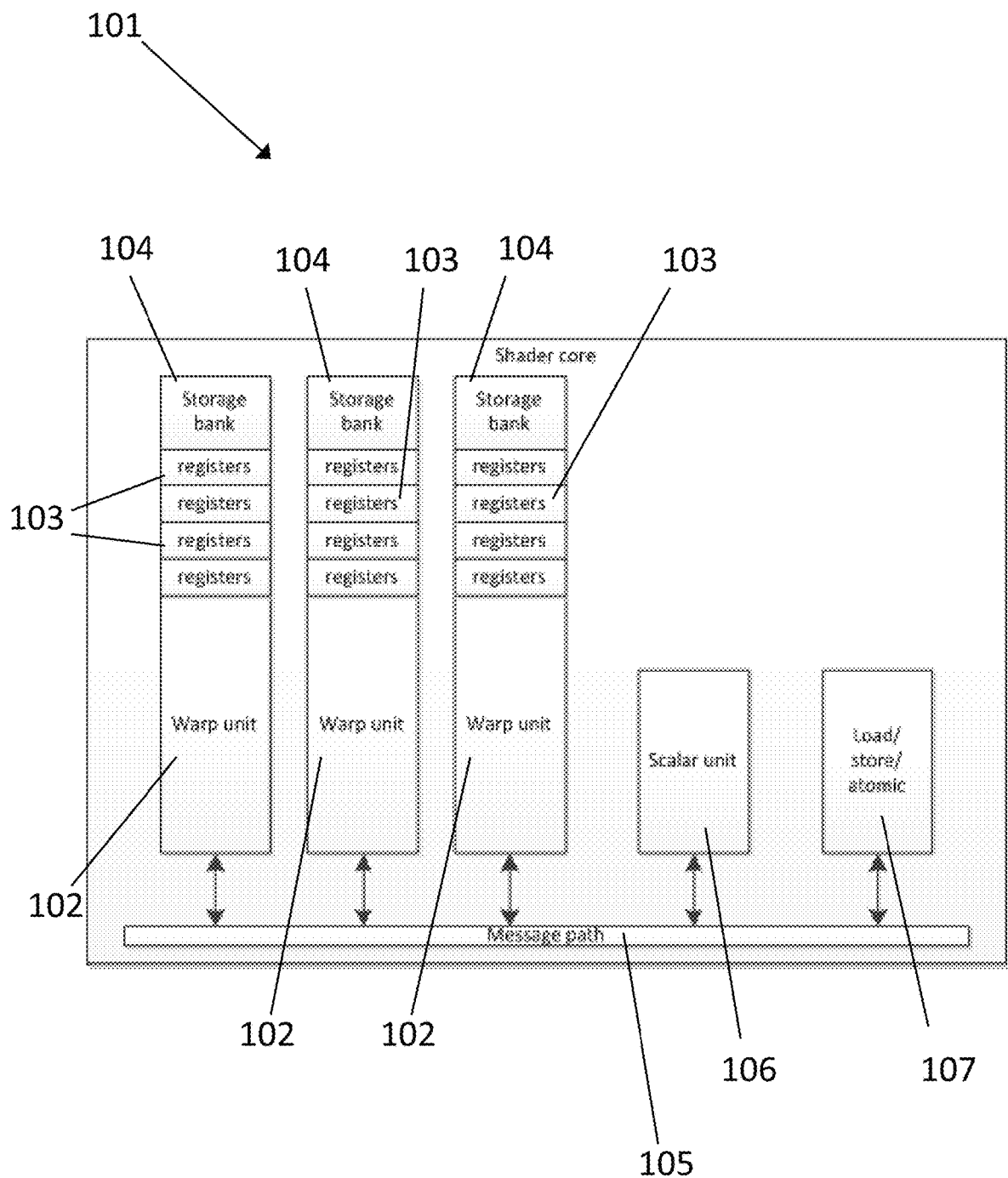
FIG. 5 shows schematically the architectural layout of a shader core that that can be operated in the manner of the technology described herein.

FIG. 5 shows a schematic of a shader core 101, e.g. of the graphics processing unit (pipeline) 3 shown in FIG. 1. The shader core 101 includes multiple execution units 102 ("warp units") which each support a group of four execution threads. Each execution unit 102 includes four sets of registers 103 (i.e. one for each thread, with each set of registers having, e.g., at least 32 registers), as well as a shared local memory area 104 ("storage bank").

Each execution unit 102 is in data communication with an interconnect 105 ("message path"). Also in data communication with the interconnect 105 is a scalar execution unit 106 and a separate "load/store/atomic" pipeline 107 which handles the load/store and atomic operations, e.g. to an external system memory or a cache hierarchy.

The operation of a compiler for a shader core will now be described with reference to the flow chart of FIG. 6.

Figure 6:
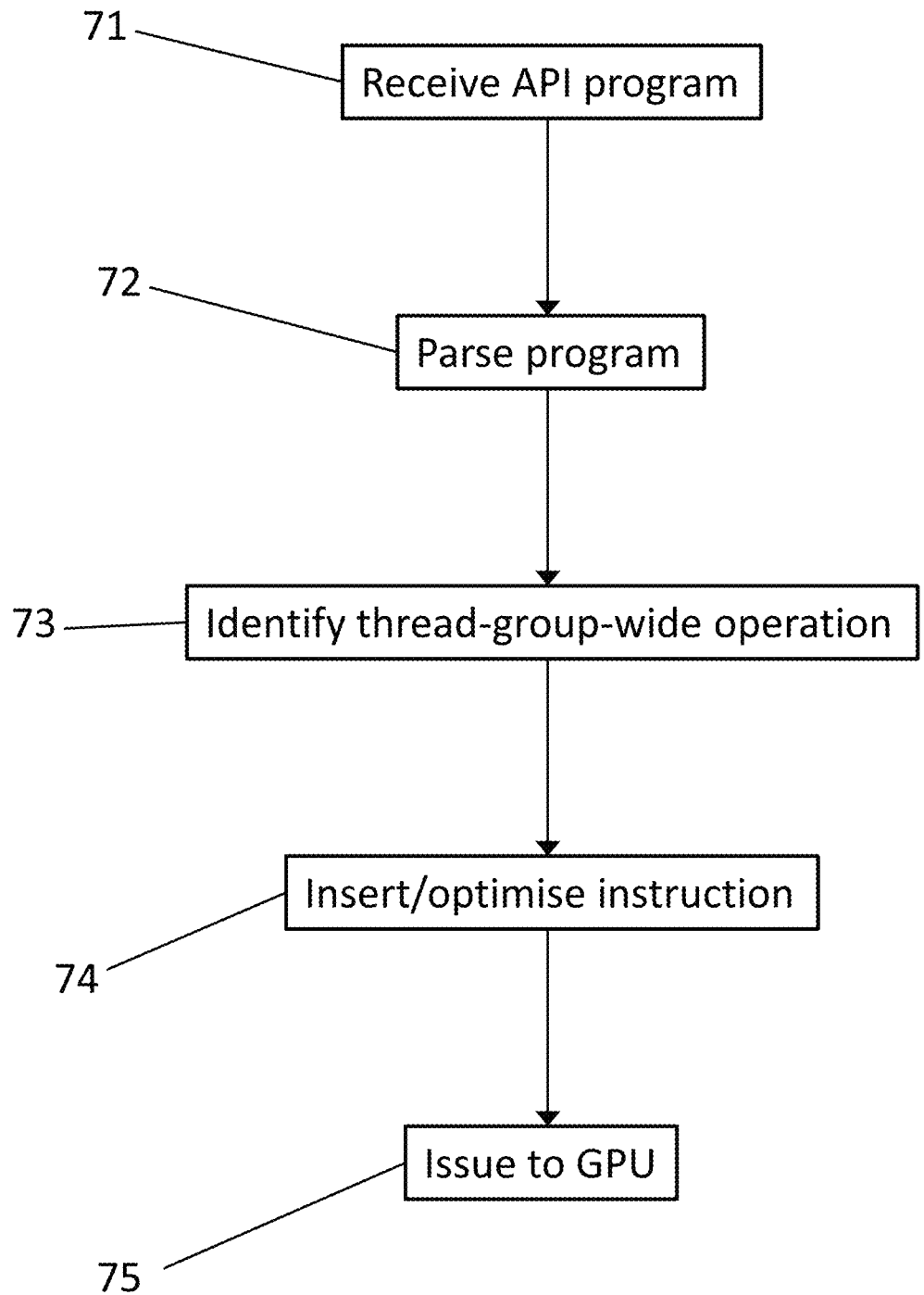
FIG. 6 shows a flow chart of the operation of a compiler that that can be operated in the manner of the technology described herein.

As described above, when graphics processing operations are to be performed for an application by an associated graphics processing unit (graphics processing pipeline), the application will generate API (application programming interface) calls, e.g. as part of a shader program, that are received by a compiler (not shown) (step 71, FIG. 6). This enables the compiler to generate appropriate instructions for the graphics processing unit to generate the graphics output required by the application. These instructions are common to each thread group for which the shader program is to be performed, e.g. for a draw call.

The API calls are parsed by the compiler (step 72, FIG. 6), with the compiler identifying operations which are to be performed or could be performed on a thread group wide basis (step 73, FIG. 6).

If the API calls explicitly include a step or steps in the program code for an operation to be performed for the thread group as a whole, the compiler compiles the API calls into an appropriate instruction or set of instructions for issuing to the graphics processing unit for execution (step 74, FIG. 6).

Additionally or alternatively, when the compiler is able to include an instruction or set of instructions to perform an operation for the thread group as a whole of its own volition in a shader program, the compiler will try to identify appropriate steps in the API calls and/or opportunities to optimise the shader program for a thread group by performing an operation for the thread group as a whole (step 74, FIG. 6), and when it identifies such steps/opportunities will insert the instruction or set of instructions in the compiled shader program automatically.

The compiled instructions are then issued to the graphics processing unit (step 75, FIG. 6), e.g. by writing them to an instruction cache, from where they can be fetched by the execution stage for a thread group.

FIGS. 7a, 7b, 7c, 8a and 8b each show an execution unit 102 ("lockstep unit") to be used for the execution of a group of execution threads. Similar to as is shown in FIG. 5, the execution unit 102 includes four individual execution lanes 110 ("lane 1", "lane 2", "lane 3", "lane 4"), i.e. one lane per execution thread.

In the execution unit 102 shown in FIGS. 7a, 7b, 7c and 8a, again similar to as is shown in FIG. 5, an individual set of registers 103 ("R1") is provided for each individual execution lane 110.

Figure 8A:
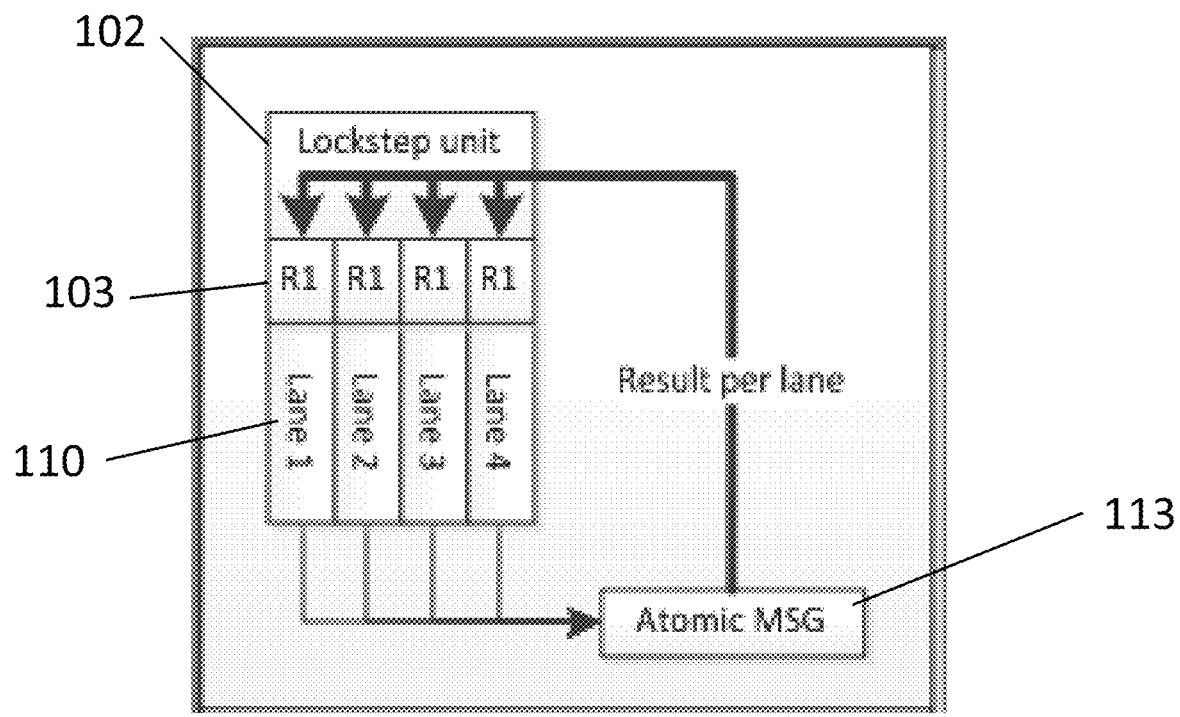
FIGS. 8a and 8b show schematically the result handling of various embodiments of the technology described herein.
Figure 8B:
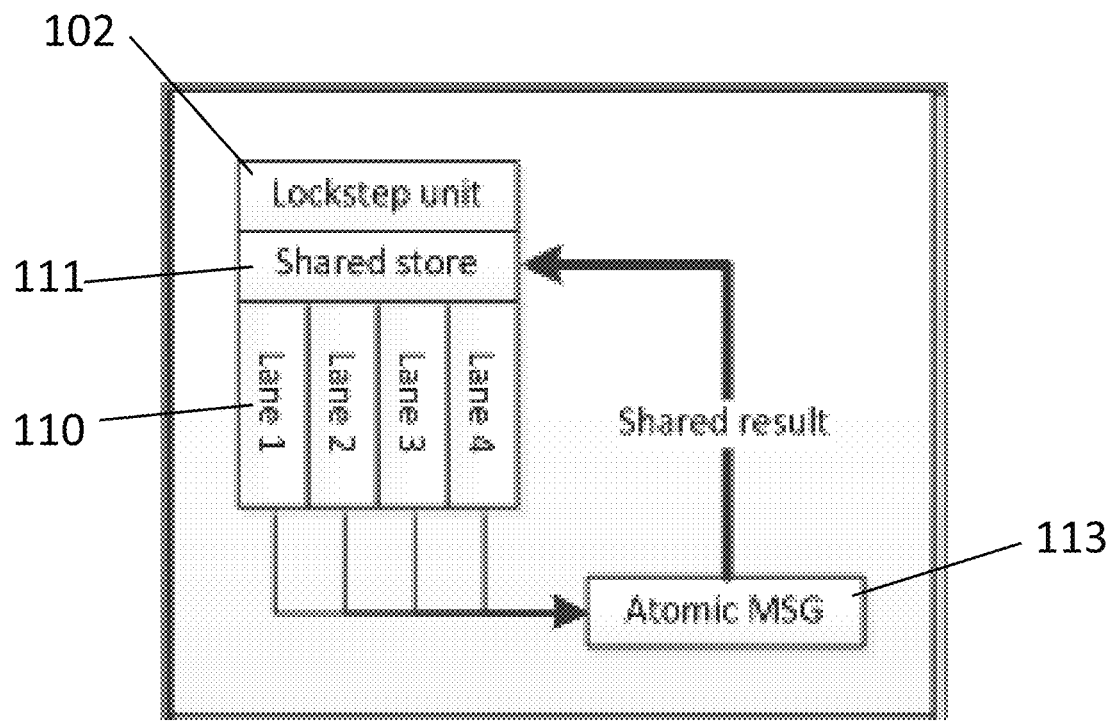

In the execution unit 102 shown in FIG. 8b, instead of individual registers a shared register 111 is provided which can be read by each of the execution threads.

Figure 7A:
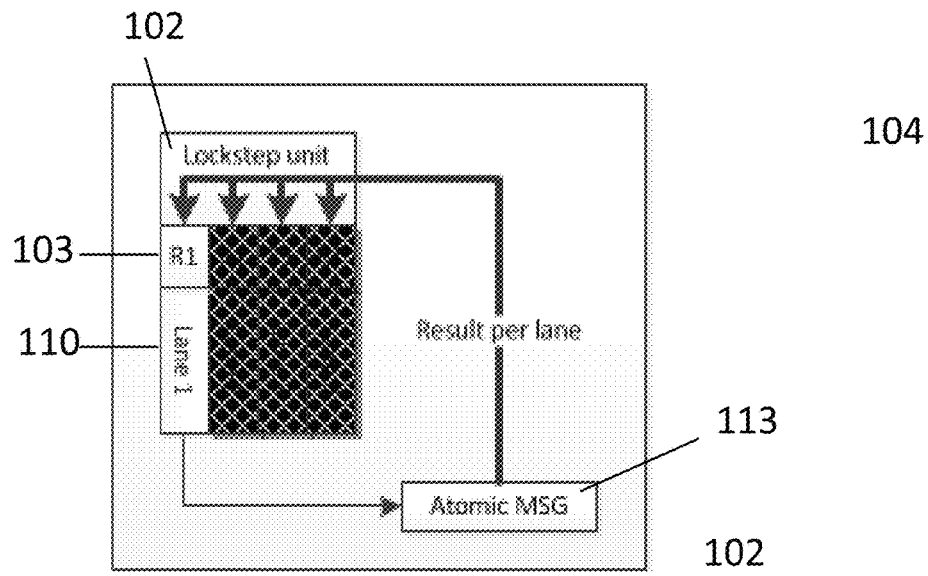
FIGS. 7a, 7b and 7c show schematically the execution operation of various embodiments of the technology described herein.
Figure 7B:
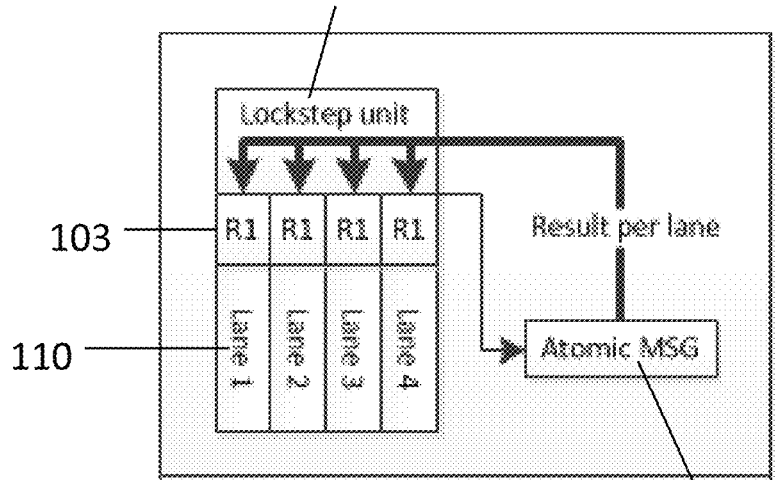
Figure 7C:
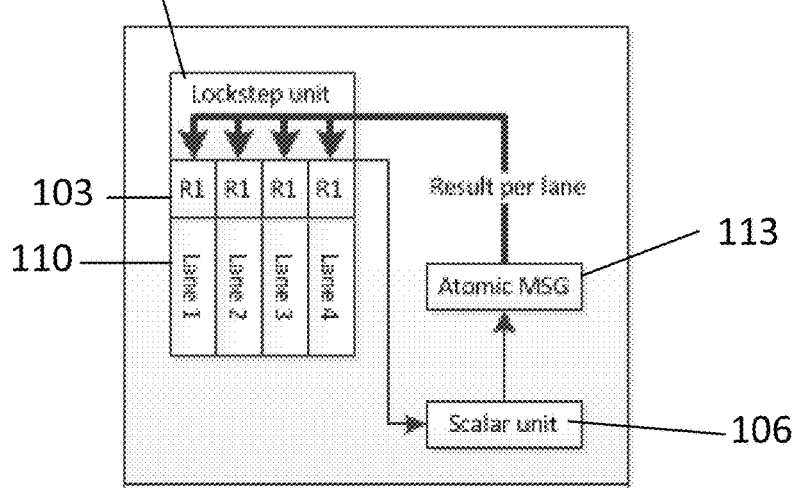

In the system shown in FIG. 7c, similar to as is shown in FIG. 5, a scalar execution unit 106 is provided in data communication with the execution unit 102 for the group of execution threads.

Operation of the group of execution threads when executing an operation for the group of execution threads as a whole will first be described with reference to FIGS. 5, 7a, 8a and 9.

Figure 9:
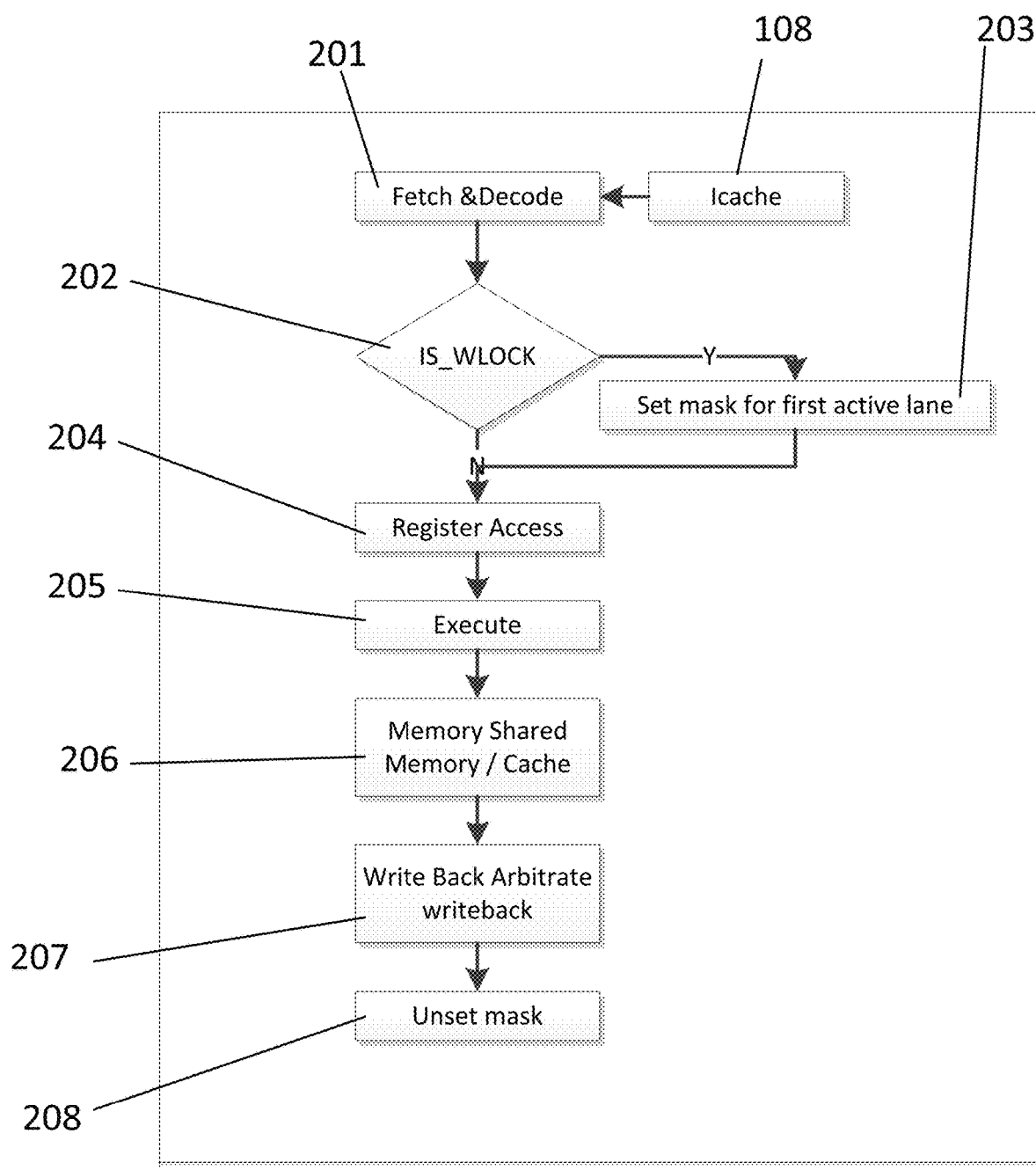
FIG. 9 shows a flow chart of the operation of an embodiment of the technology described herein.

FIG. 9 shows a flow chart showing the execution steps taken by a group of execution threads, e.g. as shown in FIG. 7a.

The compiled instructions, stored in the instruction cache 108, are fetched by the execution unit 102 (step 201, FIG. 9), when referred to by a program counter of the execution unit (the program counter being shared by each of the execution threads). The execution threads in the thread group each work through the instructions in turn, the instructions being shared and executed by each of the threads in the thread group in lockstep.

Each instruction or set of instructions is assessed as to whether it is an atomic operation which is to be performed for the thread group as a whole (step 202, FIG. 9) until one of the threads in the thread group encounters such an atomic operation which is to be performed for the thread group as a whole. (If the instructions encountered by the threads do not relate to the atomic operation which is to be performed for the thread group as a whole, after the instruction or set of instructions have been determined not to relate to such an operation (step 202, FIG. 9), the execution of the instructions is the same as for the operations described with reference to FIG. 2.)

In the embodiment in which the atomic operation comprises a lock operation, the lock operation program code may take the form:

```
While( warp_mtx.try_lock( ) );
// execute locked work for whole warp
warp_mtx.unlock( );
```

In one embodiment this results in the following atomic exchange instructions (to obtain and release the lock) being issued to the execution stage:

```
WATOM32.lock.AXCHG r0, r1, d0 // r0 - src addr, r1 - dst addr, d0
- val, p = 0
WATOM32.lock.AXCHG r0, d0, d1 // r0 - src addr, d0 - dst, d1 -
val, p = 0
```

The first instruction exchanges the value (e.g. it expects 0 and replaces it with 1) to obtain the lock (equivalent to the "try_lock" instruction), and the second instruction exchanges the value (e.g. it expects 1 as the lock is held and replaces it with 0) to release the lock.

The instruction takes the following arguments:
atom-opc: Operation to perform
src: address whose value to modify
dst: address where the result is written
val: argument to operation
p: Operation mode: (0=lock, 1=generic)

This instruction performs an atomic exchange operation with a lock across the threads of the thread group. This operation atomically stores the result of the operation to the destination (dst) address location for the first thread to encounter the instruction, using an atomic compare and exchange operation to skip all the other active threads in the thread group if the source (src) location is not set. The operation returns the result 0 when the src location has already been set and 1 otherwise.

If the operation is an atomic add operation, e.g. without using a lock, in one embodiment the instruction takes the form:

```
WATOM64.atom.AADD r0, r1, d0 // r0 - src addr, r1 - dst addr, d0
- val, p = 1
```

This instruction atomically performs an atomic add operation on the source (src) address location for the first active thread to encounter the instruction, with the other active threads in the thread group using the existing result. The old value in the source (src) address location before the operation is returned as the result of the operation.

Returning to FIGS. 5, 7a, 8a and 9, when one of the threads (e.g. being executed by the "Lane 1" execution lane 110 in FIG. 7a) in the thread group encounters the instruction (fetched from the instruction cache (step 201, FIG. 9)) for the atomic operation which is to be performed for the thread group as a whole, this is recognised by the execution unit 102 as to be performed for the thread group as a whole (step 202, FIG. 9). The execution unit 102 then masks off the other threads in the thread group (step 203, FIG. 9), i.e. renders them inactive, as shown in FIG. 7a.

(At this stage, when the atomic operation which is to be performed for the thread group as a whole comprises a lock operation, the lock of the data in memory being accessed by the thread is obtained, thus effectively obtaining the lock for the thread group as a whole.)

Data from the set of registers 103 of the execution lane 110 corresponding to the thread active in the lockstep unit 102 ("Lane 1", FIG. 7a) is then accessed (step 204, FIG. 9)

to be used in the atomic operation, e.g. in an arithmetic operation. The atomic operation can then be executed by the execution lane 110 associated with the thread (step 205, FIG. 9), which generally involves performing the atomic operation on, and writing data to, the shared memory area, using the "load/store/atomic" pipeline 107 (step 206, FIG. 9).

Once the atomic operation has been executed, the result of the operation (a uniform result ("Atomic MSG") 113), e.g. a modification of the register data owing to the arithmetic operation, is written back to the set of registers 103 of each of the execution lanes 110 of the execution stage 102 (step 207, FIG. 9), as shown in FIGS. 7a and 8a (apart from for any execution lanes which were masked out for the execution of the operation for the thread group as a whole), so that the result can be accessed by each of the threads in the thread group when they reach the instruction or set of instructions for the atomic operation.

After the result of the operation has been written to the set of registers 103 of the execution lanes 110, the mask on the execution lanes 110 of the execution stage 102 is removed (step 208, FIG. 9). Processing of the commands received by the graphics processing pipeline from the application is then continued, i.e. by working through the instructions fetched from the instruction cache, with the process described above with reference to FIGS. 5, 7a, 8a and 9 being repeated whenever an atomic operation is to be performed for the thread group as a whole.

The operation of the embodiment shown in FIG. 7b is very similar to that described for the embodiment shown in FIG. 7a. The only difference is that instead of the execution lane 110 for the thread that encounters the atomic operation which is to be performed for the thread group as a whole, e.g. "Lane 1" as shown in FIG. 7a, being used to perform the atomic operation, the instruction or set of instructions for the atomic operation is executed for the thread group as a whole by the execution unit 102, thus avoiding any of the execution lanes 110 having to be masked out. Similar to the embodiment shown in FIG. 7a, the result of the atomic operation is written back to each of the set of registers 103 for the execution lanes 110 of the execution unit 102.

The operation of the embodiment shown in FIG. 7c is very similar to that described for the embodiment shown in FIG. 7b, except that instead of the execution unit 102 executing the instruction or set of instructions, the execution of the atomic operation is performed by a separate scalar execution unit 106 (as shown in FIG. 5). Similar to the embodiments shown in FIGS. 7a and 7b, the result of the atomic operation is written back to each of the set of registers 103 for the execution lanes 110 of the execution unit 102.

In another embodiment, as shown in FIG. 8b, a shared register 111 is provided which can be read by each of the execution lanes 110 in the execution unit 102. In this embodiment, the step of providing the result of the atomic operation to all of the active threads of the thread group (step 207, FIG. 9) comprises writing the result to the shared register 111, from where it can be accessed by the execution lanes 110 for the individual threads.

It can be seen from the above that performing a warp-wide operation for a thread group as a whole, i.e. for all the threads which are being executed in lockstep, helps to avoid the threads deadlocking. This is because the operation is being performed for all the threads in the thread group together, so no one thread is waiting for the operation to complete for another thread, e.g. while accessing the memory using a lock, before that thread can perform the operation.

Furthermore, because the operation is being performed for the thread group as a whole and thus, e.g., making it redundant for each thread to perform the operation individually, the processing involved, bandwidth required, data transferred and thus power consumed is reduced.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system comprising an execution pipeline that comprises one or more programmable execution stages which execute instructions to perform data processing operations, and in which execution threads are grouped together into thread groups in which the threads of a thread group are executed in lockstep, one instruction at a time, the method comprising:

identifying, from application programming interface calls parsed by a compiler, an operation to be executed only once for the thread group as a whole by an execution stage of the execution pipeline of the data processing system, wherein the operation to be executed only once for the thread group as a whole comprises an atomic operation, wherein the atomic operation comprises an arithmetic operation and a memory transaction;

automatically inserting an instruction or set of instructions for:

performing the operation only once for the thread group as a whole, and providing the result of the operation to all the active threads of the thread group in a compiled application program code for the operation;

issuing to the execution stage the automatically inserted instruction or set of instructions to cause the execution stage to:

perform the operation only once for the thread group as a whole; and provide the result of the operation to all the active threads of the thread group; and the execution stage of the execution pipeline in response to the automatically inserted instruction or set of instructions:

performing the operation only once for the thread group as a whole; and providing the result of the operation to all the active threads of the thread group;

wherein the steps of performing the operation only once for the thread group as a whole and providing the result of the operation to all the active threads of the thread group comprise:

executing the instruction or set of instructions for one of the threads of the thread group to perform the operation for the thread group as a whole, while masking all of the threads in the thread group apart from the one thread of the thread group for which the instruction or set of instructions is being executed, so as to make the masked threads temporarily inactive.

2. A method as claimed in claim 1, wherein the operation comprises a lock operation.

3. A method as claimed in claim 1, wherein the execution stage performs the operation for the thread group as a whole and provides the result of the operation to all the active threads of the thread group by:
performing the operation for the thread group as a whole in a separate execution unit that is associated with the execution stage.

4. A method as claimed in claim 1, wherein the result of the operation is provided to all the active threads of the thread group by writing the result to respective separate storage for each of the active threads in the thread group.

5. A method as claimed in claim 1, wherein the result of the operation is provided to all the active threads of the thread group by writing the result to shared storage that can be read by all the active threads in the thread group.

6. A method as claimed in claim 1, wherein the operation to be executed for the thread group that comprises the memory transaction is part of a program to be executed by the execution stage, and the method further comprises:
reordering instructions in the program to be executed by the execution stage relative to the instruction or set of instructions that perform the operation for the thread group as a whole, before issuing the instructions for the program to the execution stage for execution.

7. A data processing system comprising:
graphics processing circuitry for executing an execution pipeline that includes one or more programmable shader stages which execute instructions to perform data processing operations and in which execution threads are grouped together into thread groups in which the threads of a thread group are executed in lockstep, one instruction at a time; and
a compiler that compiles programs for the execution pipeline to generate instructions for execution stages of the execution pipeline;
wherein the compiler is capable of:
parsing application programming interface calls;
identifying, from the parsed application programming interface calls, operations to be executed only once for the thread group as a whole by an execution stage of the execution pipeline,
wherein the operation to be executed only once for the thread group as a whole comprises an atomic operation, wherein the atomic operation comprises an arithmetic operation and a memory transaction; and
for an operation to be executed only once for the thread group as a whole:
automatically inserting an instruction or set of instructions for:
performing the operation only once for the thread group as a whole, and
providing the result of the operation to all the active threads of the thread group in a compiled application program code for the operation;
issuing to the execution stage the automatically inserted instruction or set of instructions to cause the execution stage to:
perform the operation only once for the thread group as a whole; and
provide the result of the operation to all the active threads of the thread group; and
wherein at least one execution stage of the execution pipeline is capable of, in response to the automatically inserted instruction or set of instructions:
performing the operation only once for the thread group as a whole; and
providing the result of the operation to all the active threads of the thread group;
wherein the execution stage is capable of performing the operation only once for the thread group as a whole and providing the result of the operation to all the active threads of the thread group by:
executing the instruction or set of instructions for one of the threads of the thread group to perform the operation for the thread group as a whole, while masking all of the threads in the thread group apart from the one thread of the thread group for which the instruction or set of instructions is being executed, so as to make the masked threads temporarily inactive.

8. A data processing system as claimed in claim 7, wherein the operation comprises a lock operation.

9. A data processing system as claimed in claim 7, wherein the execution stage performs the operation for the thread group as a whole and provides the result of the operation to all the active threads of the thread group by:
performing the operation for the thread group as a whole in a separate execution unit that is associated with the execution stage.

10. A data processing system as claimed in claim 7, wherein the result of the operation is provided to all the active threads of the thread group by writing the result to respective separate storage for each of the active threads in the thread group.

11. The data processing system as claimed claim 7, wherein the result of the operation is provided to all the active threads of the thread group by writing the result to shared storage that can be read by all the active threads in the thread group.

12. A data processing system as claimed in claim 7, wherein the operation to be executed for the thread group that comprises the memory transaction is part of a program to be executed by the execution stage, and the compiler is capable of:
reordering instructions in the program to be executed by the execution stage relative to the instruction or set of instructions that perform the operation for the thread group as a whole, before issuing the instructions for the program to the execution stage for execution.

13. A non-transitory computer readable storage medium storing computer software code which when executing on a processor performs a method of operating a data processing system comprising an execution pipeline that comprises one or more programmable execution stages which execute instructions to perform data processing operations, and in which execution threads are grouped together into thread groups in which the threads of a thread group are executed in lockstep, one instruction at a time, the method comprising:
identifying, from application programming interface calls parsed by a compiler, an operation to be executed only once for the thread group as a whole by an execution stage of the execution pipeline of the data processing system,
wherein the operation to be executed only once for the thread group as a whole comprises an atomic operation, wherein the atomic operation comprises an arithmetic operation and a memory transaction;
automatically inserting an instruction or set of instructions for:

performing the operation only once for the thread group as a whole, and providing the result of the operation to all the active threads of the thread group in a compiled application program code for the operation;

issuing to the execution stage the automatically inserted instruction or set of instructions to cause the execution stage to:

perform the operation only once for the thread group as a whole; and provide the result of the operation to all the active threads of the thread group; and the execution stage of the execution pipeline in response to the automatically inserted instruction or set of instructions:

performing the operation only once for the thread group as a whole; and providing the result of the operation to all the active threads of the thread group;

wherein the steps of performing the operation only once for the thread group as a whole and providing the result of the operation to all the active threads of the thread group comprise:

executing the instruction or set of instructions for one of the threads of the thread group to perform the operation for the thread group as a whole, while masking all of the threads in the thread group apart from the one thread of the thread group for which the instruction or set of instructions is being executed, so as to make the masked threads temporarily inactive.

* * * * *